Feb. 14, 1939.　　　G. O. BECKMAN　　　2,147,081
TIRE VULCANIZING MOLD
Filed May 28, 1937
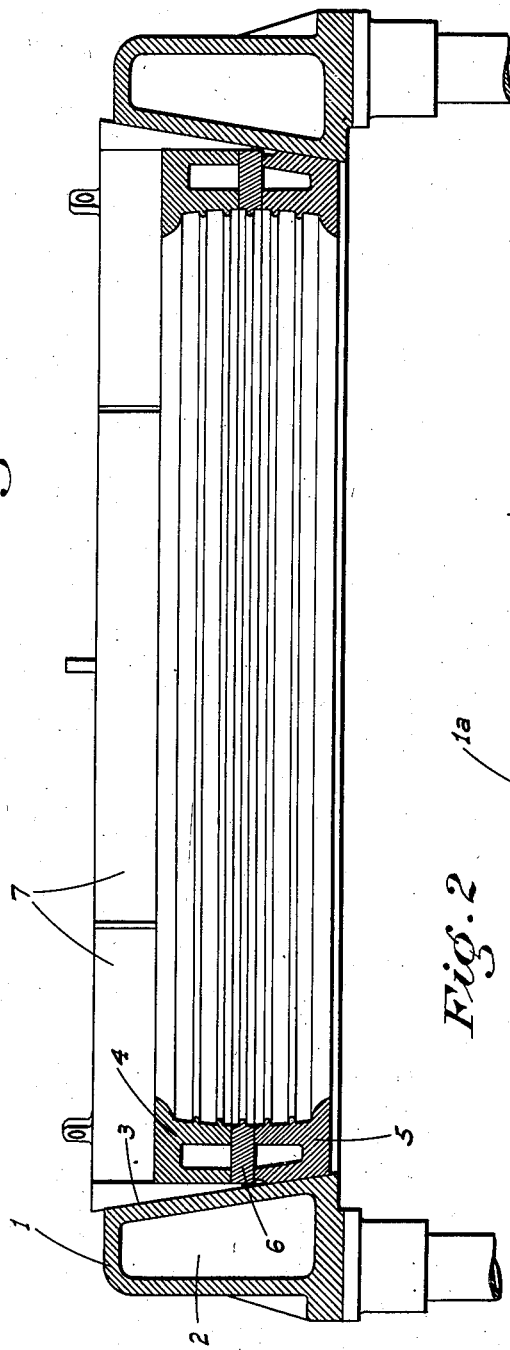
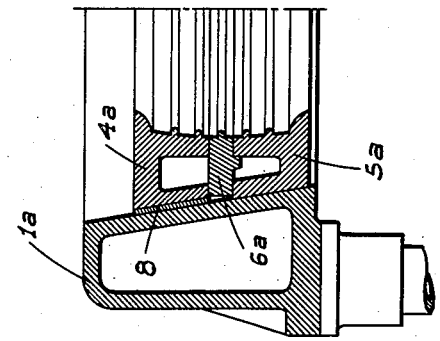
INVENTOR
*G. O. Beckman*
BY
ATTORNEY Patented Feb. 14, 1939

2,147,081

UNITED STATES PATENT OFFICE 2,147,081

TIRE VULCANIZING MOLD

George O. Beckman, Lodi, Calif., assignor to Super Mold Corporation of California, a corporation of California Application May 28, 1937, Serial No. 145,238

1 Claim. (Cl. 18—38)

This invention relates to tire vulcanizing molds; my principal object being to provide a mold which includes a one-piece body forming a steam chamber of endless ring-like form, and complementary endless matrix sections removably in the body; the body and matrix sections being so arranged that they will snugly fit the body without any clamping means being necessary, irrespective of the swelling or permanent increase in diameter which apparently takes place inevitably in aluminum matrices with the constant heating of the same.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawing similar characters of reference indicate corresponding parts in the several views:

Figure 1 is a sectional elevation showing the essential features of my improved mold.

Figure 2 is a fragmentary sectional elevation of a modified mold arrangement.

Referring now more particularly to the characters of reference on the drawing and particularly at present to Fig. 1, the mold comprises a horizontal endless ring-like body 1 having a continuous steam circulating chamber 2 formed therein. The bore 3 of the body is machined and convergingly tapers from the top down.

The matrix is formed of separate upper and lower cooperating or complementary endless ring-like sections 4 and 5 respectively. The exterior periphery of the lower section 5 is tapered to conform to that of the bore 3 and is of such size that it fits in said bore adjacent the bottom. The exterior periphery of the upper matrix section 4 is however straight or non-tapered and its diameter is slightly less than that of the matrix section 5 at the top. Said upper section may thus rest directly on the lower matrix section, or on a spacer ring 6 also formed with a straight exterior periphery and the same diameter as the upper matrix section, and which rests on the lower section.

In either case the upper matrix section and the spacer ring, if used, are centrally located and held in place in the body by a wedge unit 7, which is preferably segmental as shown. This is adapted to removably project between the bore of the body and the upper matrix section, the external and internal peripheries of the wedge unit conforming to the contour or slope of the body and the upper matrix section respectively.

By means of this construction either matrix section may have a permanent increase in diameter and still fit in the body with the necessary snug fit; the body being sufficiently deeper than the matrix unit accommodates matrix sections of different depth or disposed at different levels in the body.

The matrix sections here shown are intended for tire recapping purposes and it is of course understood that the complete apparatus includes adjustable pressure rings to engage the sides of a tire inwardly of the matrix sections, as for instance in the manner shown in the copending application for patent of E. A. Glynn, Serial No. 117,304, filed December 23, 1936.

In the type of structure shown in Fig. 2, the body 1a is of the same form as that previously described, but the matrix sections 4a and 5a are both tapered on the outside to correspond to the taper of the bore of the body. The diameter of the upper matrix section at the bottom is the same as that of the lower matrix section at the top, so that both will closely fit the bore of the body in cooperating relation with each other when used with a spacer ring. If a spacer ring 6 is used, the size of the upper matrix section is increased by the use of a segmental or one-piece shim band 8, the thickness of which is determined by the depth of the spacer ring and the consequent raising and spacing of the upper matrix section from the bore of the body. With this arrangement also the matrix sections can increase in diameter and still fit the body in proper cooperating relationship with each other.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

A vulcanizing mold comprising a body provided with a steam chamber and having a circular taper bore, separate cooperating inner and outer matrix sections of endless ring-like form adapted to fit within the body; the exterior periphery of the inner section being tapered to fit the bore of the body adjacent the small end thereof while the exterior periphery of the outer matrix section is non-tapered, and a wedge element removably fitted between the body and said outer matrix section and whose outer and inner peripheries are parallel to the bore of the body and the outer periphery of the outer matrix section respectively.

GEORGE O. BECKMAN.